Sept. 29, 1964
E. C. PETERSON
3,150,518
SURFACE TENSION MEASURING DEVICE
Filed June 29, 1961
4 Sheets-Sheet 1
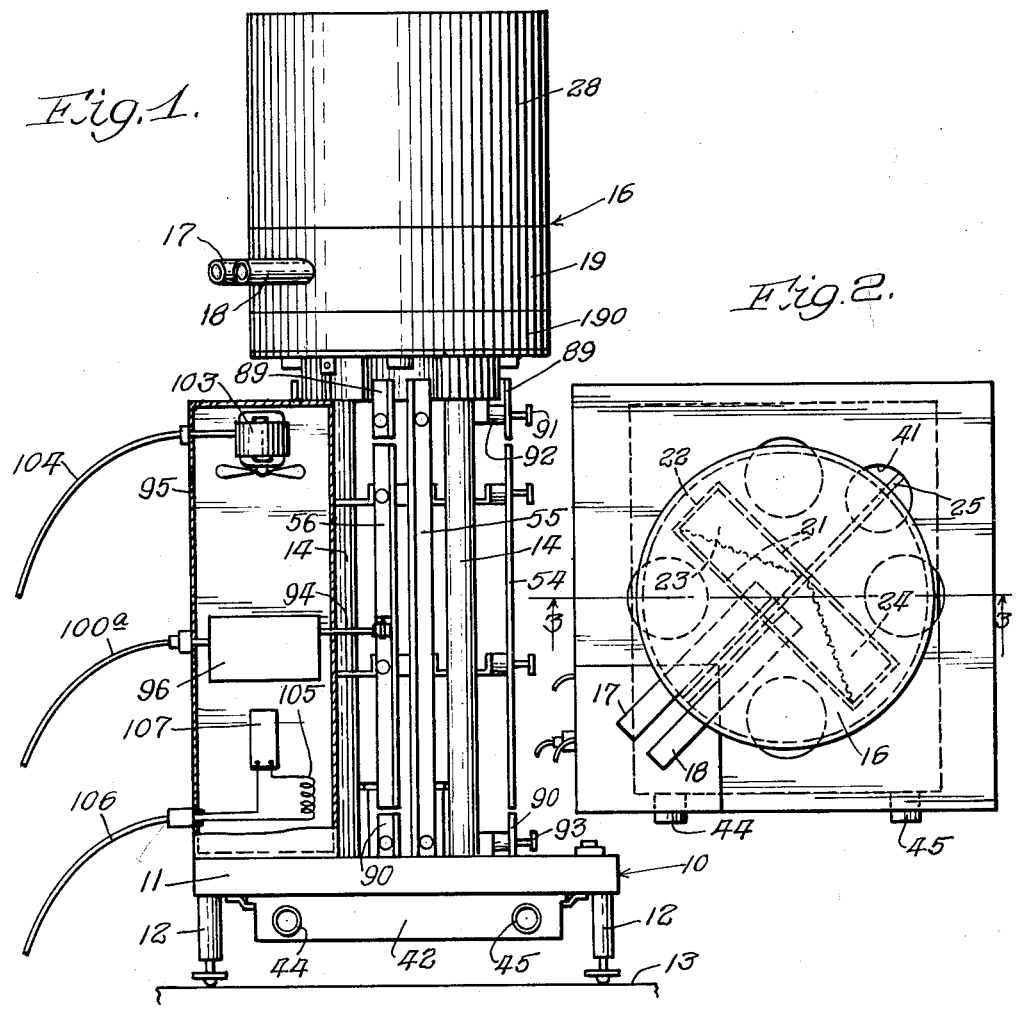
Fig. 1.
Fig. 2.
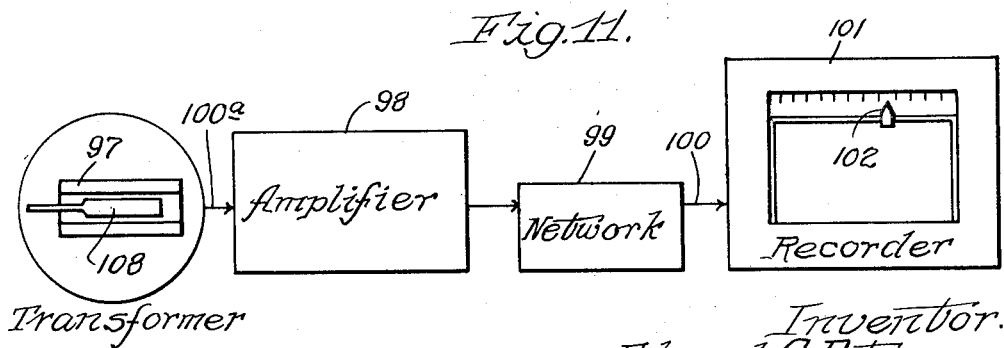
Fig. 11.
Inventor:
Edward C. Peterson,
By Holgren, Brady, Wegner,
Allen, Stellman, Attys.

Sept. 29, 1964     E. C. PETERSON     3,150,518
SURFACE TENSION MEASURING DEVICE
Filed June 29, 1961     4 Sheets-Sheet 2
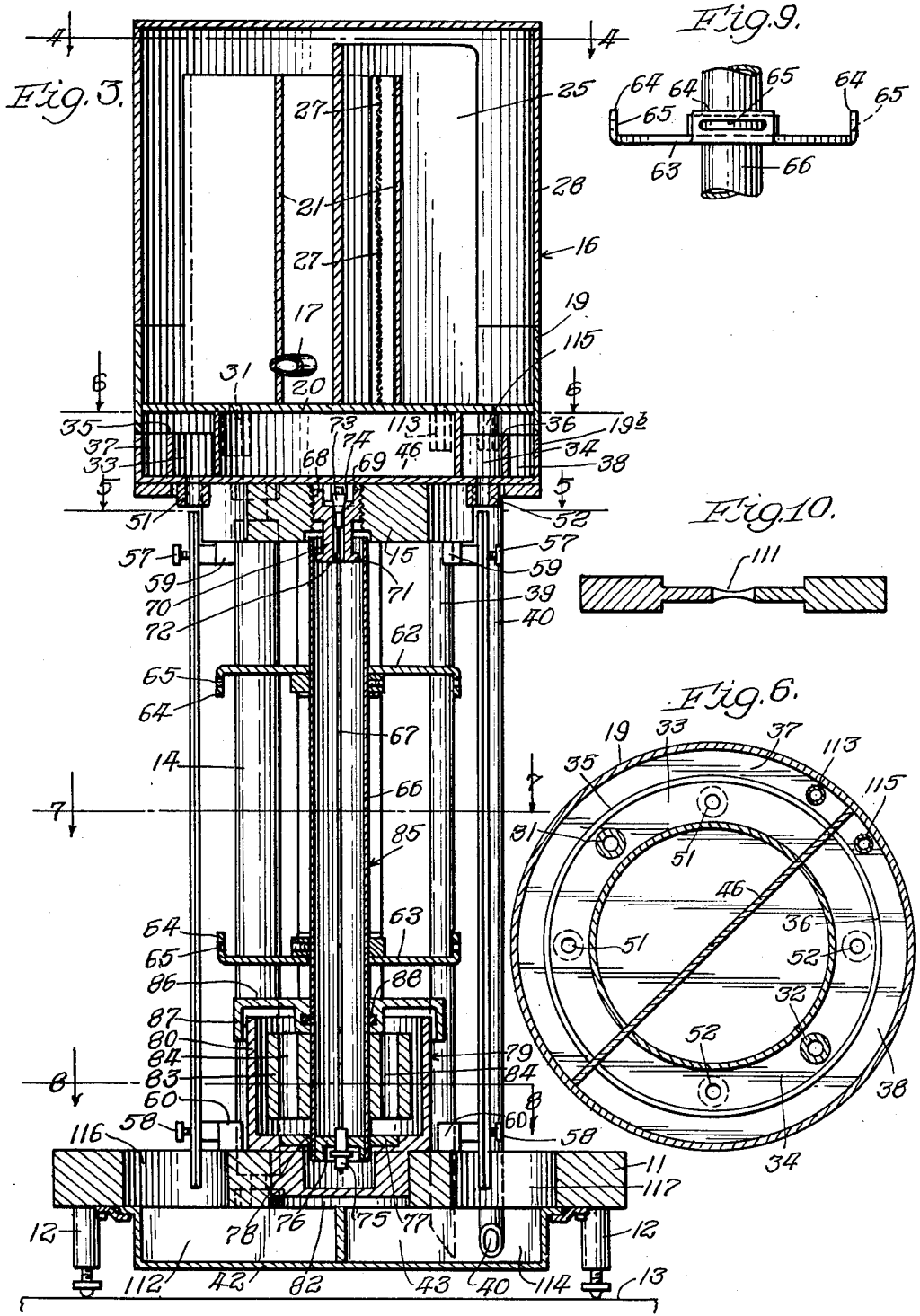

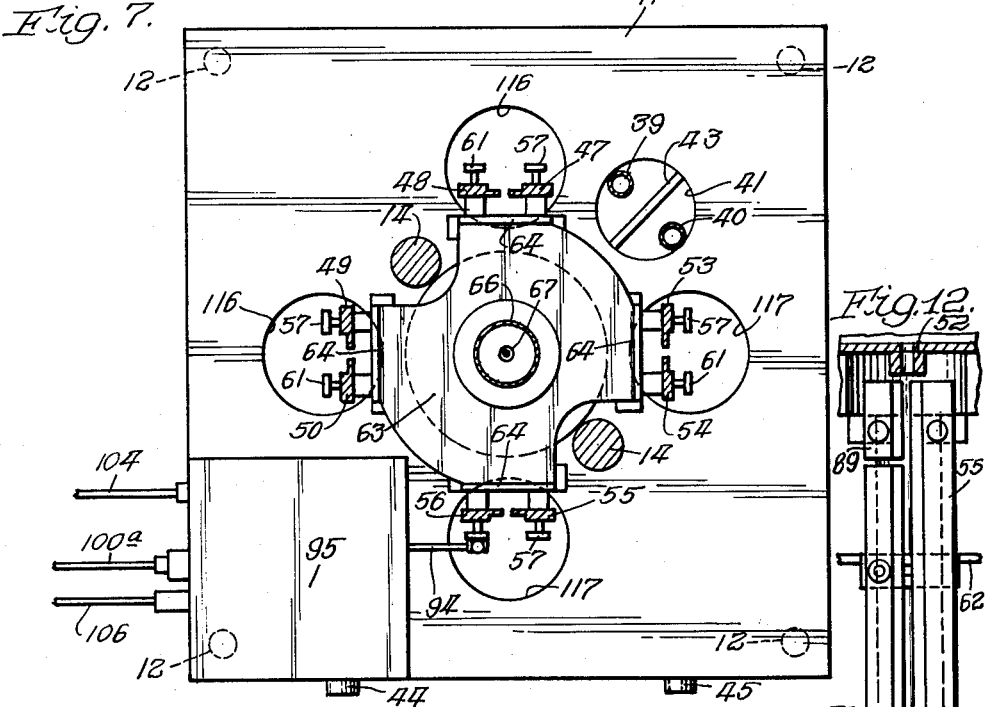

United States Patent Office 3,150,518
Patented Sept. 29, 1964

3,150,518
SURFACE TENSION MEASURING DEVICE
Edward C. Peterson, Benton Harbor, Mich., assignor to Whirlpool Corporation, a corporation of Delaware
Filed June 29, 1961, Ser. No. 120,606
19 Claims. (Cl. 73—53)

This invention relates to a device for indicating the surface tension of a liquid.

When liquids such as water contain solutes or other materials such as surface active agents or detergents containing surface active agents associated therewith, the surface tension of these liquids varies depending upon the quantity of the solute. This provides a ready means for indicating or monitoring the change in solutes by monitoring or indicating the surface tension of the resulting liquid. The invention here, therefore, is concerned with a device for indicating the surface tension of such a liquid and preferably for continuously indicating the surface tension and therefore changes in surface tension of a liquid in which the surface tension conditions are continuously changing.

The device of this invention has found an important use in the continuous monitoring of surface tensions of laundry liquids to indicate relative amounts of surface active agents or detergents containing surface active agents in the liquid as well as in the rinse water during the rinsing operation. Thus, the device is usable not only to indicate the relative amount of detergent, for example, in the liquid but also to indicate when substantially all detergent has been rinsed from the article within the piece of laundry equipment. The device for indicating surface tension and changes in surface tension is also useful in many other industries such as brewing, petroleum, detergent, textile, metal dipping, distilling, paint and similar industries wherein it is necessary to control accurately the addition of ingredients to liquids when these ingredients have an effect on the surface tension of the resulting liquid mixture.

One of the features of this invention is to provide an improved device for indicating, preferably continuously, the dynamic surface tension of a liquid.

Other features and advantages of the invention will be apparent from the following description of one embodiment thereof taken in conjunction with the accompanying drawings. Of the drawings:

FIGURE 1 is a side elevational view partially broken away of a device embodying the invention.

FIGURE 2 is a plan view of the device.

FIGURE 3 is a vertical sectional view taken substantially along line 3—3 of FIGURE 2 and of FIGURE 5.

FIGURE 6 is a horizontal sectional view taken substantially along line 6—6 of FIGURE 3.

FIGURE 7 is a horizontal sectional view taken substantially along line 7—7 of FIGURE 3.

FIGURE 8 is a horizontal sectional view taken substantially along line 8—8 of FIGURE 3.

FIGURE 9 is an elevational view of a mounting bracket forming a part of a mounting member.

FIGURE 10 is an enlarged cross sectional view illustrating a second embodiment of a pair of spaced apart film supporting members.

FIGURE 11 is a diagrammatic representation of a measuring system forming a part of the device.

Figure 4:
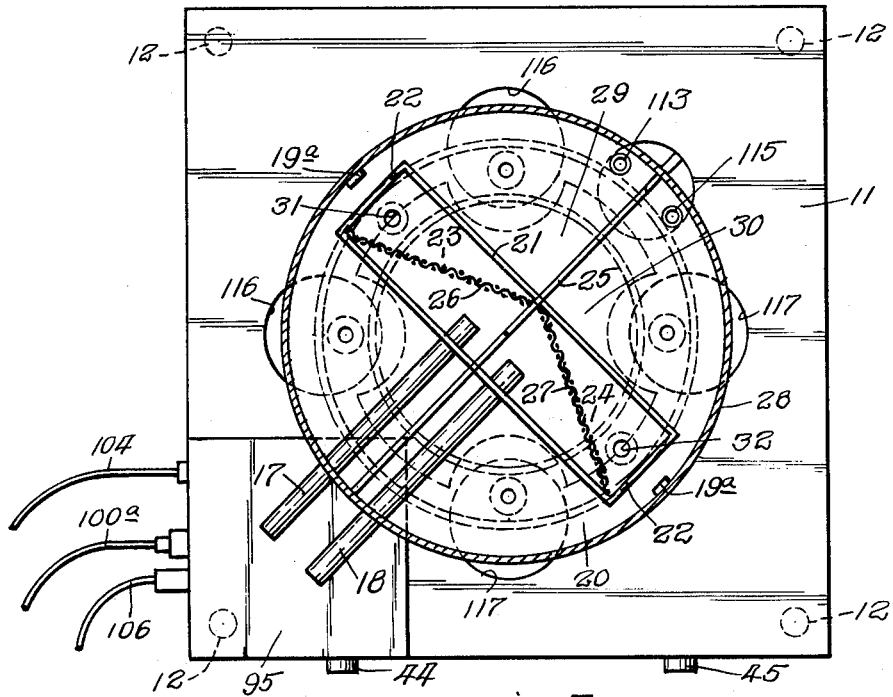
FIGURE 4 is a horizontal sectional view taken substantially along line 4—4 of FIGURE 3.
Figure 5:
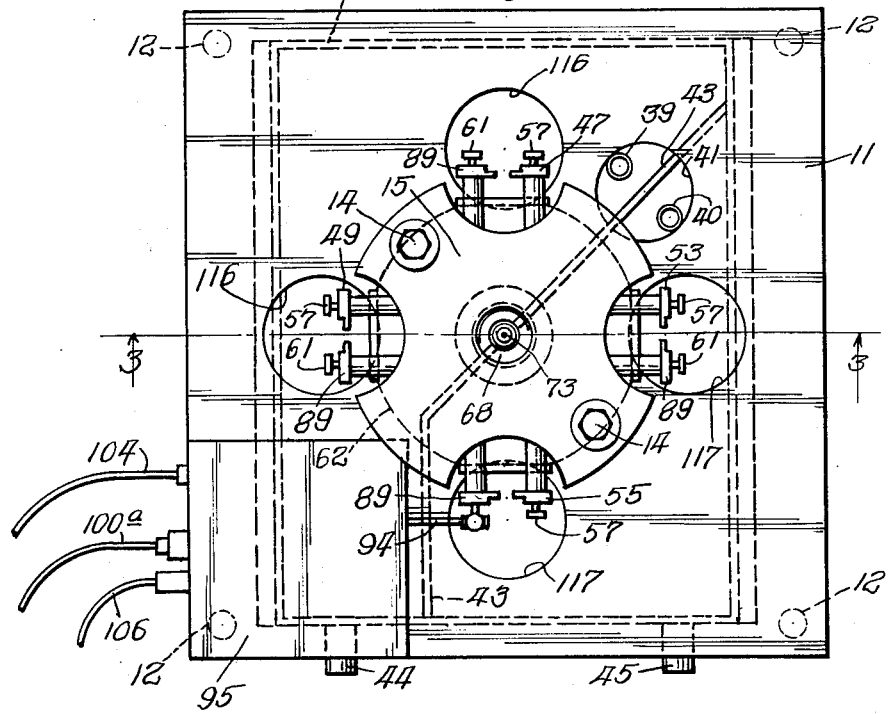
FIGURE 5 is a horizontal sectional view taken substantially along line 5—5 of FIGURE 3.

An earlier form of surface tension indicating device is disclosed and claimed in my copending application Serial No. 22,627, filed April 15, 1960, now Patent No. 3,096,642, and assigned to the same assignee as the present application.

The device 10 illustrated in the accompanying drawings comprises a base 11 having three adjustable supporting legs 12, so that the device can be leveled on a supporting surface 13. Extending upwardly from the base 11 are a pair of diametrically opposite supporting columns 14 that are essentially parallel to each other. Supported on the top of these columns is a top relatively rigid plate 15 on top of which is located a supply means 16 for providing a liquid supply to the device under substantially constant head.

The liquid supply to the device 10 includes a pair of liquid inlet pipes 17 and 18 extending into an intermediate cylindrical portion 19 of the supply means 16. This cylindrical portion surrounds a flat plate 20 on top of which is located side 21 and end 22 walls forming an upright chamber of substantially rectangular cross section divided into one portion 23 and a second portion 24. Bisecting the two side walls 21 is a vertically positioned plate 25 that extends diametrically across the horizontal circular plate 20 with the plate 25 extending upwardly from the plate 20. As is shown in FIGURE 4 the walls 21 and 22 and the bisecting vertical plate 25 form the two rectangular end-to-end chambers 23 and 24. Each of these chambers is provided with a diagonally positioned, upwardly extending wire mesh screen 26 and 27 with one edge of each screen being adjacent the other and both being adjacent a wall 21 and the opposite edges being spaced apart and located at the corners formed by the other wall 21 and the end walls 22. Enclosing the walls 21 and 22 and the divider plate 25 is a cylindrical cover 28 whose bottom is open and whose lower edge rests on the upper open edge of the cylindrical portion 19. As can be seen from an examination of the drawings, the cylindrical cover 28, the bottom plate 20, the cylindrical portion 19 and a bottom portion 19b form an enclosed cylindrical liquid chamber. As is shown in FIGURE 3 the divider plate 25 extends above the chamber walls 21 and 22. The cover 28 is held in place by the side edges of plate 25 and by small blocks 19a attached to the upper inner surface of portion 19.

The divider plate 25 serves to separate the liquid coming in through conduits or pipes 17 and 18 to chambers 23 and 24. The walls 21 and 22 serve as weirs to provide a constant head of incoming liquid in these chambers. The liquids coming in through pipes 17 and 18 flow through screens 26 and 27 in order to filter out foreign material. The liquid from chamber 23 then overflows the walls 21 and 22 into internal chamber 29. Liquid from pipe 18 similarly overflows into adjacent overflow chamber 30. The liquids are kept separate of course by the divider plate 25.

The liquids in the chambers 23 and 24 are therefore at a constant head due to the overflow over the walls 21 and 22. From these constant head chambers 23 and 24 there are provided a downwardly extending conduit 31 from the chamber 23 and a similar conduit 32 from the chamber 24 both downstream from their screens 26 and 27. These conduits each empty into a semi-annular second constant head chamber 33 for the conduit 31 and a similar constant head chamber 34 for the conduit 32. Constant heads in the chambers 33 and 34 are provided by semi-annular overflow walls 35 and 36, respectively. In flowing over the walls 35 and 36 the liquids flow into outer semi-annular overflow chambers 37 and 38. In the meantime, liquid from overflow chambers 29 and 30 flow through conduits 113 and 115, respectively, also to chambers 37 and 38.

The combined overflow liquids flow from chambers 37 and 38 by way of downwardly extending conduits 39 and 40. These conduits 39 and 40 extend downwardly through an opening 41 in the base 11 and empty into a receiving drawer 42 located beneath the base 11 and surrounded by the supporting legs 12. This drawer 42 is also divided into two sections by vertical dividing wall 43 so that the two liquids cannot mix. The liquids then flow outwardly from the receiving drawer 42 by way of a pair of conduits 44 and 45.

As can be seen from the above description, two parallel flow paths are provided. These flow paths are maintained divided by the upper divider plate 25, the intermediate divider plate 46, both in the upper supply means 16, and the bottom divider wall 43 in the receiving drawer 42. Each part of the liquid supply means separated by these divider walls or portions provides a plurality of constant level or constant head pools of liquid in series flow. The first constant level pools in each conduit system are the pools within the chambers 23 or 24. The second constant level pools in the liquid supply system are provided by the pools in the constant level chambers 33 or 34. In addition to providing constant pressure heads, these chambers 23, 24, 33 and 34 also serve to reduce the turbulence of the monitored liquid and thereby tend to facilitate more accurate measurements.

The surface tension of the liquids is continuously indicated by having the one liquid flow downwardly from the first liquid chamber 33 between two pairs of spaced apart, vertical film supporting rods 47, 48, 49 and 50. Each pair of rods is located beneath a downwardly extending conduit 51 from the second chamber 33 in the series of constant level chambers. Similar conduits 52 supply the other liquid to two pairs of spaced, vertical film supporting rods 53, 54, 55 and 56. These conduits 52 supply liquid from the second constant level and thus constant head pool 34 in this liquid system. From the pairs of supporting rods the one liquid flows through openings 116 in the base 11 into the drawer chamber on its side of the drawer divider plate 43. Similarly, the other liquid flows from its pairs of supporting rods through openings 117 in the base 11 into the drawer chamber on its side of plate 43.

Of these pairs of rods in the illustrated embodiment rods 47, 49, 53 and 55 are fixed in position by bolting their upper ends to the upper plate 15 by means of screws 57 and by bolting their lower ends to the bottom plate or base 11 by means of screws 58. As can be seen in FIGURE 3, the screws 57 actually engage downwardly extending studs 59 on the plate 15 while screws 58 engage similar studs 60 on the bottom plate 11.

The movable rods or bars 48, 50, 54 and 56 of the pairs of rods are bolted as by screws 61 to a pair of spaced horizontal plates 62 and 63. Each of these plates as is illustrated in FIGURE 9 is provided with four flanges illustrated at 64 each having an elongated slot 65 to which the movable rod is actually attached. The slot 65 in each flange 64 permits adjusting the movable rod relative to the fixed rod so that it can be clamped in its adjusted position by means of the adjusting and clamping screws 61.

The supporting plates 62 and 63 for the movable rods of the pairs of rods are attached to a vertically positioned, elongated hollow metallic cylinder 66. Supporting plates 62 and 63 and the attached movable rods 48, 50, 54 and 56 of the pairs of rods and the central cylinder 66 form an assembly 85 that is supported for arcuate or free rotational movement through a small arc without measurable friction. This is accomplished by gravitationally suspending the assembly from a wire 67 which is located centrally of the hollow cylinder 66. This wire which may be of stainless piano wire of about 0.01 inch diameter provides frictionless suspension and, because of the nature of the wire, resisting torsional forces may be ignored. The wire of course is concentric with the axis of rotation of the assembly. Side thrusts of this assembly are controlled at both the top and the bottom. Thus, at the top there is provided a hollow fitting 68 threaded into a central opening 69 in the top plate 15 and provided with a downwardly extending neck portion 70 provided at its bottom with a circular polished rim 71 adjacent the inner surface of the top of the cylinder 66. The cylinder 66 adjacent polished rim 71 is also polished. This threaded fitting 68 is provided with an axial central opening 72 and also serves as the attachment and adjustment point for the upper end of the supporting wire 67. This upper end of the wire is attached to an anchor member 73 having the shape of an inverted frustum of a cone and located at the upper end of the central opening 72 and with the base of this cone located in an upper enlarged hollow chamber 74 in the top of the fitting 68.

The bottom of the wire 67 is attached to a bottom anchor member 75 which in turn is in supporting contact with a bottom closure 76 which is attached and extends across the bottom of the interior of the cylinder 66. Assembly 85 is suspended from anchor member 73 to anchor member 75 by wire 67 which always is in tension. Side thrusts of the bottom of the assembly are controlled and resisted by an annular bottom bearing member 77 positioned around the bottom end of the cylinder 66 and also provided with a rounded and polished inner surface 78. The outside area of cylinder 66 adjacent polished inner surface 78 is also polished. The bearings 71 and 78 are therefore merely polished circular ring structures of steel located closely adjacent surfaces of the cylinder 66. Since the rotation of the assembly during surface tension measurements is very limited, usually only about 2° at the maximum, the bearings are provided with liberal clearance so that rolling rather than a sliding action occurs. This of course permits movement during surface tension force changes that are essentially frictionless.

Surrounding the bottom end of the cylinder 66 is a cup 79 having a cylindrical side 80 of large diameter and a bottom 81 extending into a central opening 82 in the bottom plate 11. This cup 79 contains within it a metal block 83 that is attached to the bottom of the elongated cylinder 66. This metal block 83 is provided with a plurality of openings 84 extending vertically therethrough and located around the bottom of the cylinder 66. The side of the block 83 is spaced from the inner surface of the side 80 of the cup 79 and the cup 79 is adapted to contain a dampening liquid of high viscosity to provide for viscous dampening of the movement of the central assembly 85 caused by the surface tension force changes. An excellent dampening fluid has been found to be polydimethylsiloxane liquid of 200,000 centistokes viscosity at 25° C. Such a liquid is one of the Dow-Corning 200 silicone fluids. The cup 79 is provided with a cover 86 having a cylindrical outer rim 87 spaced outwardly of the top edge of the cup side 80 and resting on top of the metal block 83 when the cover is in position. The cover 85 surrounds the cylinder 66 and is slidable upwardly on the cylinder to expose the top of the cup 79. A circular gasket 88 is carried by the cover and bears against the outer surface of the cylinder 66.

As can be seen, the upper bearing 71 is not lubricated and is protected by the top plate 15 so that dirt cannot enter. The bottom bearing 78 is lubricated by the silicone liquid within the cup 79.

Each of the movable rods 48, 50, 54 and 56 is provided at its top and bottom with short rod sections 89 and 90, respectively, aligned with the movable rod so as to guide the liquid films onto and from longer movable rods. The upper rod sections 89 are attached to the upper plate 15 as by screws 91 engaging downwardly extending fittings 92 while the lower rod sections 90 are similarly attached to the base 11 by screws 93.

One of the movable rods 56 carries a linkage bar 94 that is arranged substantially parallel to a tangent of the arc of movement of the assembly 85. This bar 94 extends into a cabinet 95 which is completely enclosed. The end of the bar 94 that is within the cabinet 95 extends into a load cell 96 which contains a differential transformer 97 (FIGURE 11) or other suitable transducer. The load cell 96 is electrically connected by connection 100a to a preamplifier-amplifier 98 and a network 99 arranged in series and located externally of cabinet 95. The network 99 through an electrical connection indicated at 100 operates an externally located recorder 101 for recording by means of a moving pen 102 changes in surface tension. The transformer 97, amplifier unit 98, network 99 and recorder 101 are all standard items of equipment.

The interior of the cabinet 95 is kept at a constant temperature by means illustrated diagrammatically in FIGURE 1. This means includes a motor operated fan 103 provided with a power cord 104 and an electric heater 105 powered by an electric cord 106 and controlled by a thermostat 107. There may of course be provided baffles, ducts and the like in order that the load cell 96 will be subjected to substantially uniform temperature. In actual practice a suitable temperature is about 140° F. with a variation of ±2°F. This constant average temperature eliminates zero drift of the load cell which would otherwise occur due to ambient temperature changes. Furthermore, by locating the load cell within the cabinet 95 it is only necessary to control the temperature within the cabinet and not of the entire device.

The load cell is essentially a simple device and contains a differential transformer or other suitable transducer which electrically measures deflection of the assembly 85, a spring system (not shown) to which the transformer core 108 is attached, a housing and means for adjusting (not shown) to allow centering of the transformer core in the transformer body. The extent of deflection is recorded on the recorder 101 in the customary manner.

The film supporting rods are preferably of the cross sectional shape shown in FIGURE 10. However, rods such as 49 and 50 of an alternate shape and shown in the drawings may be provided if desired. In both instances corresponding rods support a liquid film 111 (FIGURE 10) therebetween. It is preferred that the rods be spaced so that a 1/16 inch film space is provided at the top of the assembly and that the space gradually increase to about 3/32 inch at the bottom. This tapering aids the film flow from top to bottom.

The operation of the device is as follows: The two liquids one of which may be a known liquid such as water and the other the unknown liquid such as a solution of a detergent are first passed through a heat exchange apparatus (not shown) so that the two liquids will be at substantially the same temperature. One of the liquids enters the device through the inlet pipe 17 into the chamber 23. This liquid overflows the walls 21 and 22 so that a constant head is maintained in the chamber 23. The liquid flows through the filtering screen 26 to remove solids from the liquid and then flows downwardly in the conduit 31 to the second constant head pool in the chamber 33. This constant head is maintained by excess liquid overflowing the wall 35 into the chamber 37. From the constant head pool 33 the liquid flows down through the conduits 51 to between the two pairs of rods 47 and 48 and 49 and 50 (FIGURE 7). The liquid flows in a film as illustrated at 111 in FIGURE 10 down between the two pairs of rods into a chamber 112 in the bottom drawer 42 on one side of the divider plate 43. The surface tension pulls movable rods 48 and 50 toward the fixed rods 47 and 49, respectively, of the two pairs of rods so that the pulling effect is additive. From the chamber 112 the liquid flows from the outlet conduit 44 back to its source. In the meantime overflow over the walls 21 and 22 forming the chamber 23 flows downwardly through the conduit 113 into chamber 37 while overflow from chamber 33 also flows into chamber 37 by flowing over the wall 35. This overflow from the chamber 37 then flows through the pipe 39 also into the chamber 112 in the bottom drawer 42.

The other liquid flows through the inlet pipe 18 and through the other side of the liquid system in exactly the same manner. Thus, from the pipe 18 liquid flows into the chamber 24 where the liquid therein forms a constant head pool due to overflow over the walls 21 and 22. This overflow passes in a similar manner downwardly through conduit 115 into the chamber 38. From chamber 38 the liquid passes downwardly through exit pipe 40 and into chamber 114 of drawer 42. The liquid from chamber 24 flows downwardly through conduit 32 into chamber 34 forming a second constant head pool. Liquid from chamber 34 spills over the wall 36 into the chamber 38 and from there down the exit pipe 40 into the chamber 114 in the drawer 42. The liquid from the second constant head pool in the chamber 34 then flows through the two conduits 52 to between the two pairs of rods 53 and 54 and 55 and 56 (FIGURE 7). The surface tension of this other liquid pulls these movable rods 54 and 56 toward the respective fixed rods 53 and 55 so that here again the surface tension effect is additive but in the opposite direction from the just described additive forces of the first liquid. The film flows down between these rods and into the chamber 114 where it joins the excess liquid so that this liquid flows from the drawer through its conduit 45 and back to its source.

As can be seen in the illustrated embodiment, especially at FIGURE 7, the movable rods 48 and 50, and 54 and 56, of the two sets of rods tend to be pulled toward the fixed rods 47 and 49, and 53 and 55, by the surface tension of the two liquids. In the embodiment just described, therefore, the surface tension force of the known liquid acts against the surface tension force of the unknown liquid so that the resultant of the forces is the difference between them. This resultant tends to cause arcuate movement of the assembly 85 which is recorded by means of the load cell 96, the preamplifier-amplifier and network on the recorder 101 and thus is a continuous indication of changes in surface tension of the unknown liquid.

The device of this invention is capable of continuous measurement of the surface tension of a solution even when this surface tension is undergoing constant changes as when a solution is becoming more dilute or more concentrated. Furthermore, these changes can be indicated continuously in comparison to a known standard or the device may be operated to indicate the surface tension changes without regard to a standard. The device continuously samples the solution and measures the surface tension by indicating the force of a constant film of the liquid. These surface tension characteristics are recorded by causing the surface tension forces to bring about movement of a movable mass with this movement being converted by a transducer to a continuous electrical signal which may be recorded continuously. In the actual construction of such a device it has been found that it can be calibrated to an accuracy of ±0.5 dyne per centimeter and can be used either for direct measurement of liquid conditions or in process control or both. Furthermore, the device is simple and operates trouble-free and can be easily protected from drafts or accidental contact with the moving parts during operation by providing a simple transparent shield (not shown) if desired. The device is of solid construction and is easily portable. Furthermore, it may be easily disassembled such as for cleaning and can be quickly reassembled without requiring delicate re-adjustment of the movable parts such as the pairs of rods between which the films flow. Similarly, the critical parts of the device so far as temperature changes are concerned are contained within an enclosure in which the temperature is easily kept constant. Temperature variations in the remainder of the device are unimportant.

In addition the movement in the movable portions of the device is caused by surface tension of the liquid being tested only. The movable assembly including the movable rods of the pairs of rods is for all practical purposes frictionless in its movement. The instrument provides liquid to the test portion of the device at substantially constant head without requiring complicated equipment and this is important as it has been found that changes in liquid head would cause changes in the surface tension results.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A device for continuously indicating the dynamic surface tension of a liquid, comprising: a pair of spaced apart members capable of supporting a film of liquid therebetween; means mounting one of said members for arcuate movement relative to the other of said members; means for continuously flowing said liquid between the members to provide said film; and means for continuously indicating the resultant of the forces exerted on said members due to the surface tension forces of said film.

2. A device for continuously indicating the dynamic surface tension of a liquid, comprising: a pair of spaced apart member capable of supporting a film of liquid therebetween; means mounting one of said members for arcuate movement relative to the other of said members; means providing a substantially constant pressure source of said liquid; means for continuously flowing said liquid from said source between the members; and means for continuously indicating the resultant of the forces exerted on said members due to the surface tension forces of said film.

3. A device for continuously indicating the dynamic surface tension of a liquid, comprising: a plurality of pairs of spaced apart members each pair capable of supporting a film of liquid therebetween; means mounting one member of each of said pairs for arcuate movement relative to the other of said members; means for continuously flowing a first liquid between the members of some of said pairs; means for continuously flowing a second liquid between the members of others of said pairs, said flow between said members providing said films in continuous flow; and means for continuously indicating the resultant of the forces exerted on all said pairs of members due to the surface tension forces of said films.

4. A device for continuously indicating the dynamic surface tension of a liquid, comprising: a plurality of pairs of spaced apart members each pair capable of supporting a film of liquid therebetween; means mounting one member of each of said pairs for arcuate movement relative to the other of said members; means providing a source of a first liquid at a substantially constant pressure; means providing a source of a second liquid at a substantially constant pressure; means for continuously flowing said first liquid from its said source between the members of some of said pairs; means for continuously flowing said second liquid from its said source between the members of others of said pairs, said flow between said members providing said films in continuous flow; and means for continuously indicating the resultant of the forces exerted on all said pairs of members due to the surface tension forces of said films.

5. The device of claim 4 wherein said constant pressures of both said liquids are substantially equal.

6. A device for continuously indicating the dynamic surface tension of a liquid, comprising: a plurality of pairs of spaced apart members each pair capable of supporting a film of liquid therebetween; means providing a first liquid at a substantially constant head pressure; means providing a second liquid at a substantially constant head pressure that is substantially equal to said first liquid head pressure; means providing a first continuous flow path for said first liquid from said first liquid head pressure means to, between and from some of said pairs of spaced members; means providing a second continuous flow path for said second liquid from said second liquid head pressure means to, between and from others of said pairs of spaced members, said flow between said members providing said films in continuous flow; and means for continuously indicating the resultant of the forces exerted on all said pairs of members due to the surface tension forces of said flow.

7. A device for continuously indicating the dynamic surface tension of a liquid, comprising: a plurality of pairs of spaced apart members each pair capable of supporting a film of liquid therebetween, one member of each pair being substantially fixed and the other being movable when subjected to film surface tension; a mounting member arcuately movable about an axis to which the movable members of said pairs are attached with the fixed members of said pairs being adjacent said mounting member; means for continuously flowing said liquid between the members of each of said pairs to provide said films, at least certain of said pairs having said movable members in substantially the same relative positions to said fixed members of said pairs to produce an additive surface tension force on said mounting member; and means for continuously indicating the resultant of the forces exerted on said pairs of members due to the surface tension forces of said films.

8. The device of claim 7 wherein said pairs of spaced apart members are located substantially equal distances from said axis.

9. A device for continuously indicating the dynamic surface tension of a liquid, comprising: a plurality of pairs of spaced apart members each pair capable of supporting a film of liquid therebetween, one member of each pair being substantially fixed and the other being movable when subjected to film surface tension; a mounting member arcuately movable about an axis to which the movable members of said pairs are attached with the fixed members of said pairs being adjacent said mounting member; means providing a source of a first liquid at a substantially constant pressure; means providing a source of a second liquid at a substantially constant pressure; means for continuously flowing said first liquid from its said source between the members of some of said pairs; means for continuously flowing said second liquid from its said source between the members of others of said pairs, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

10. A device for continuously indicating the dynamic surface tension of a liquid, comprising: a plurality of pairs of spaced apart members each pair capable of supporting a film of liquid therebetween, one member of each pair being substantially fixed and the other being movable when subjected to film surface tension; a mounting member arcuately movable about an axis to which the movable members of said pairs are attached with the fixed member of said pairs being adjacent said mounting member, said pairs of spaced apart members being located substantially equal radial distances from said axis; means providing a first liquid at a substantially constant head pressure; means providing a second liquid at a substantially constant head pressure that is substantially equal to said first liquid head pressure; means providing a first continuous flow path for said first liquid from said first liquid head pressure means to, between and from some of said pairs of spaced members; means providing a second continuous flow path for said second liquid from said second liquid head pressure means to, between and from others of said pairs of spaced members, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

11. A device for continuously indicating the dynamic surface tension of a liquid, comprising: a plurality of pairs of spaced apart, substantially vertical members each pair capable of supporting a film of liquid therebetween, one member of each pair being substantially fixed and the other being movable when subjected to film surface tension; a mounting member arcuately movable about a substantially vertical axis to which the movable members of said pairs are attached with the fixed members of said pairs being adjacent said mounting member, said pairs of spaced apart members being located substantially equal radial distances from said axis; means providing a first liquid at a substantially constant head pressure including a plurality of first weir means arranged in series to provide a series of pools of said first liquid each of substantially constant level; means providing a second liquid at a substantially constant head pressure including a plurality of second weir means arranged in series to provide a series of pools of said second liquid each of substantially constant level, both said head pressures being substantially equal; means providing a first continuous flow path for said first liquid from said first liquid head pressure means to, between and from some of said pairs of spaced members; means providing a second continuous flow path for said second liquid from said second liquid head pressure means to, between and from others of said pairs of spaced members, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

12. A device for continuously indicating the dynamic surface tension of a liquid, comprising: a plurality of pairs of spaced apart, substantially vertical members each pair capable of supporting a film of liquid therebetween, one member of each pair being substantially fixed and the other being movable when subjected to film surface tension; a mounting member arcuately movable about a substantially vertical axis to which the movable members of said pairs are attached with the fixed members of said pairs being adjacent said mounting member, said pairs of spaced apart members being located substantially equal radial distances from said axis and each of said pairs being aligned substantially along a tangent to the circle of which each of said distances is a radius; means suspending said mounting member for said arcuate movement; means providing a first liquid at a substantially constant head pressure including a plurality of first weir means arranged in series to provide a series of pools of said first liquid each of substantially constant level; means providing a second liquid at a substantially constant head pressure including a plurality of second weir means arranged in series to provide a series of pools of said second liquid each of substantially constant level, both said head pressures being substantially equal; means providing a first continuous flow path for said first liquid from said first liquid head pressure means to, between and from some of said pairs of spaced members; means providing a second continuous flow path for said second liquid from said second liquid head pressure means to, between and from others of said pairs of spaced members, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

13. A device for continuously indicating the dynamic surface tension of a liquid, comprising: a plurality of pairs of spaced apart, substantially vertical members each pair capable of supporting a film of liquid therebetween, one member of each pair being substantially fixed and the other being movable when subjected to film surface tension; a mounting member arcuately movable about a substantially vertical central axis to which the movable members of said pairs are attached with the fixed members of said pairs being adjacent said mounting member, said pairs of spaced apart members being located substantially equal radial distances from said axis and positioned substantially symmetrically about said axis and each of said pairs being aligned substantially along a tangent to the circle of which each of said distances is a radius; a suspending member at said axis suspending said mounting member for said arcuate movement; means located above said mounting member and said spaced apart members for providing a first liquid at a substantially constant head pressure including a plurality of first weir means arranged in series to provide a series of pools of said first liquid each of substantially constant level; means located above said mounting member and said spaced apart members for providing a second liquid at a substantially constant head pressure including a plurality of second weir means arranged in series to provide a series of pools of said second liquid each of substantially constant level, both said head pressures being substantially equal; means providing a first continuous gravity flow path for said first liquid from said first liquid head pressure means to, between and from some of said pairs of spaced members; means providing a second continuous gravity flow path for said second liquid from said second liquid head pressure means to, between and from others of said pairs of spaced members, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

14. A device for continuously indicating the dynamic surface tension of a liquid, comprising: a plurality of pairs of spaced apart, substantially vertical members each pair capable of supporting a film of liquid therebetween, one member of each pair being substantially fixed and the other being movable when subjected to film surface tension; a mounting member arcuately movable about a substantially vertical central axis to which the movable members of said pairs are attached with the fixed members of said pairs being adjacent said mounting member, said mounting member having a hollow interior at said axis, said pairs of spaced apart members being located substantially equal radial distances from said axis and positioned substantially equal radial distances from said axis and positioned substantially symmetrically about said axis and each of said pairs being aligned substantially along a tangent to the circle of which each of said distances is a radius; an elongated suspending member in said interior located at said axis suspending said mounting member for said arcuate movement; dampening means for dampening said rotation; means located above said mounting member and said spaced apart members for providing a first liquid at a substantially constant head pressure including a plurality of first weir means arranged in series to provide a series of pools of said first liquid each of substantially constant level; means located above said mounting member and said spaced apart members for providing a second liquid at a substantially constant head pressure including a plurality of second weir means arranged in series to provide a series of pools of said second liquid each of substantially constant level, both said head pressures being substantially equal; means providing a first continuous gravity flow path for said first liquid from said first liquid head pressure means to, between and from some of said pairs of spaced members; means providing a second continuous gravity flow path for said second liquid from said second liquid head pressure means to, between and from others of said pairs of spaced members, the movable members of said some pairs being in substantially the same relative positions to said fixed members of said some pairs to produce an additive surface tension force on said mounting member and the movable members of said other pairs being in substantially the same relative positions to said fixed members of said other pairs to produce an additive surface tension force on said mounting member, said flow between said members providing said films in continuous flow; and means for continuously indicating the resultant of the forces exerted on all said pairs of members due to the surface tension forces of said films.

15. A device for continuously monitoring the dynamic surface tension of a liquid, comprising: first and second substantially parallel members positioned adjacent each other and capable of supporting a film of liquid therebetween; means mounting said first member for arcuate movement relative to said second member about an axis spaced from and parallel to said first member; means for continuously flowing liquid between said first and second members to provide a film therebetween; and means responsive to movement of said first member for continuously monitoring the dynamic forces exerted between said first and second members due to the surface tension of said film.

16. A device for continuously indicating the dynamic surface tension of a liquid comprising: a first set of spaced, interconnected substantially parallel members; a second set of spaced, interconnected, substantially parallel members, the members of said second set being equal in number to those of said first set and being respectively positioned adjacent the members of said first set to provide a plurality of pairs of spaced apart members for supporting liquid film between each of said pairs of members; means mounting said second set of members for arcuate movement about an axis substantially parallel to said first set of members; means for continuously flowing liquid between said pairs of members to provide said liquid films; and means responsive to movements of said second set of members for continuously monitoring the resultant of the forces exerted on said pairs of members due to the surface tension of said films.

17. A device for continuously indicating the dynamic surface tension of a liquid comprising: a first set of spaced interconnected substantially parallel members; a second set of spaced, interconnected, substantially parallel members, the members of said second set being equal in number to those of said first set and being respectively positioned adjacent the members of said first set to provide a plurality of pairs of spaced apart members for supporting liquid film between each of said pairs of members; means mounting said second set of members for arcuate movement about an axis substantially parallel to said first set of members; means for continuously flowing liquid between said pairs of members to provide said liquid films; and means responsive to movements of said second set of members for continuously monitoring the resultant of the forces exerted on said pairs of members due to the surface tension of said films, said first set of members being gravitationally suspended by a wire located at said axis.

18. The invention set forth in claim 16 further including a stationary support and means rigidly connecting said first set of members to said stationary support.

19. A device for continuously indicating the dynamic surface tenson of a liquid comprising: a first set of spaced, interconnected substantially parallel members; a second set of spaced, interconnected, substantially parallel members, the members of said second set being equal in number to those of said first set and being respectively positioned adjacent the members of said first set to provide a plurality of pairs of spaced apart members for supporting liquid film between each of said pairs of members; means mounting said second set of members for arcuate movement about an axis substantially parallel to said first set of members; means for continuously flowing liquid between said pairs of members to provide said liquid films; means responsive to movements of said second set of members for continuously monitoring the resultant of the forces exerted on said pairs of members due to the surface tension of said films; and constant temperature means enclosing said responsive means for compensating for ambient temperature variations of said responsive means.

References Cited in the file of this patent
UNITED STATES PATENTS

| | | |
|---|---|---|
| 2,627,177 | Vonnegut | Feb. 3, 1953 |
| 2,895,329 | Hettche et al. | July 21, 1959 |
| 2,968,172 | Johnson | Jan. 17, 1961 |
| 3,096,642 | Peterson | July 9, 1963 |